United States Patent [19]

Ji

[11] Patent Number: 5,321,111

[45] Date of Patent: Jun. 14, 1994

[54] METHOD FOR EXTRACTING POLYISOPRENES FROM PLANTS

[76] Inventor: Wan Ji, 101 Front St., #A, College Station, Tex. 77840

[21] Appl. No.: 127,808

[22] Filed: Sep. 28, 1993

[51] Int. Cl.⁵ ............................................. C08G 83/00
[52] U.S. Cl. ...................................... 528/1; 526/340.2; 528/930; 528/931
[58] Field of Search ........................... 528/1, 930, 931

[56] References Cited

U.S. PATENT DOCUMENTS

| | | | |
|---|---|---|---|
| 4,136,131 | 1/1979 | Buchanan | 528/930 |
| 4,139,903 | 7/1979 | Bauman | 528/930 |
| 4,435,337 | 3/1984 | Kay et al. | 528/930 |

OTHER PUBLICATIONS

Review Paper; 1992 Natural Rubber; M. R. Sethuraj and N. M. Mathew; 29 pgs.

Polym.-Plast. Technol. Eng. (1988) Continuous Solvent Extraction Process for Recovery of Natural Rubber from Guayule; (pp. 335-350).

Northern Regional Research Center, Agricultural Research Service, U.S. Dept. of Agriculture, Peoria, Ill. 61604 Pilot-Scale Guayule Processing Using Countercurrent Solvent Extraction Equipment; (4 pgs).

Anal. Chem. 1986, 58; Modified Soxhlet Procedure for the Quantification of Resin and Rubber Content of Guayule; E. J. Nurthen., B. V. McCleary, P. L. Multhorpe and J. W. Whitworth; (pp. 448-453).

The Natural Rubber Producers' Research Assoc., Rubber, Gutta Percha, and Chicle; B. L. Archer and B. G. Audley; Date Unknown; (pp. 310-343).

*Primary Examiner*—Morton Foelak
*Attorney, Agent, or Firm*—Marcella D. Watkins; C. Steven McDaniel

[57] ABSTRACT

A method for extracting polyisoprenes from cells, comprising the steps of contacting the cells with an organic protein-denaturing compound, rupturing the cells to release the polyisoprene from the cells and recovering the polyisoprene. The preferred protein denaturing compound comprises an aqueous solution of a guanidine salt.

13 Claims, No Drawings

METHOD FOR EXTRACTING POLYISOPRENES FROM PLANTS

TECHNICAL FIELD OF THE INVENTION

The present invention relates to the production of rubber from natural sources and more particularly, to a chemical extraction of natural rubber from plants. Still more particularly, the present invention discloses a method for chemically treating guayule plants so that the rubber contained therein is released and recovered without significant time or energy requirements.

BACKGROUND OF THE INVENTION

Natural rubber and its related polyisoprenes, gutta percha and chicle, have many uses and great commercial value. Natural rubber comprises cis-polyisoprene, while gutta percha comprises trans-polyisoprene and chicle is a mixture of the two. Rubber is the most widely used of the polyisoprenes and in many instances no completely successful synthetic substitute has been found. The balance of the present discussion is directed to the recovery of rubber, but it will be understood that the methods of the present invention are equally applicable to the recovery of all three types of polyisoprene. Hereinafter, the word rubber will be used generally to refer to all polyisoprenes that may be so recovered.

Polyisoprenes occur in many plant species in the form of sap, or latex. Table I is a list of some typical rubber, gutta percha, and chicle containing species. Latex is a white, tacky, aqueous suspension of polyisoprene globules encased in protein. The globules are of round or irregular shape, and vary in size from 0.5 to 3.0 microns in diameter.

Once coagulated and collected, the resulting rubber can be chemically treated, such as by vulcanization, and is suitable for many industrial, commercial and household uses.

Besides Hevea, hundreds of other species produce polyisoprenes in varying amounts, including dandelions and milkweed, as illustrated in Table I above. In these other species, the rubber is typically not as accessible as it is in the Hevea plant because it is stored within individual cells in their roots and stems. A few of these species produce commercially significant amounts of rubber, which are currently extracted by expensive and time-consuming processes.

One such species is the guayule plant (*Parthenium argentatum*), a desert shrub native to parts of Mexico and the southwestern United States. Since the 1940's, guayule has been selectively cultivated so that its rubber content has been greatly increased. One of the most desirable aspects of rubber-production from guayule is the ability of these shrubs to grow on arid land otherwise unsuitable for agriculture. Because guayule accumulates rubber in parenchyma cells in its stems and roots, however, it is necessary to macerate these tissues in order to obtain the rubber contained therein. Thus, the difficulty of recovery of the rubber is still a major obstacle to large-scale commercialization of the guayule rubber industry. Furthermore, guayule plants produce significant amounts of resinous material, which combines with the rubber during extraction and must be removed before the rubber can be put to commercial use.

Presently, rubber is extracted from guayule by one of two methods. The water flotation method consists of crushing and parboiling the guayule plant in water to

TABLE I

| Genus and Species | Common Name | Commercial Method |
|---|---|---|
| Alstonia spp. | | Multiple incisions |
| Dyera spp.+ | | Single incision |
| *Funtumia elastica* | | Multiple incisions |
| Landolphia spp. | | Multiple incisions |
| *Cryptostegia grandiflora* | | Cutting of leafless shoots |
| *Parthenium argentatum** | Guayule | Milling of whole plant |
| *Scorzonera tau-saghyz** | | Milling of roots |
| Solidago spp.* | Goldenrod | Milling or solvent extraction |
| *Taraxacum kok-saghyz** | Russian dandelion | Milling of roots |
| *Hevea brasiliensis* | Para rubber tree | Single incision |
| *Manihot glaziovii* | Ceara rubber tree | Multiple incisions |
| Castilla (Castilloa) spp. | Hule tree | Single incision |
| *Ficus elastica* | India or Assam rubber tree | Multiple incisions |
| *Euonymus europaeus** | Spindle tree | Solvent extraction |
| *Eucommia ulmoides** | | Solvent extraction |
| *Cnidoscolus elasticus** | Red chilte | Multiple incisions |
| *Cnidoscolus tepiquensis** | White chilte | Multiple incisions |
| *Mimusops balata* | Bullet tree | Multiple incisions |
| *Palaquium gutta* | Taban tree | Multiple incisions |
| *Achras sapota* | Sapodilla tree | Multiple incisions |

*Temperate zone species
+ Dyera spp. are included under rubber producers, but the polymer formed has not been characterized.

At present, natural rubber is most easily recovered from the flowing sap of rubber trees (*Hevea brasiliensis*), which are indigenous to tropical regions such as Brazil, Malaysia, and Indonesia. Because the latex flows within the tree, it is possible to obtain quantities of latex by simply piercing or cutting the outer bark of the tree and collecting the sap that flows from the cut. If managed properly, latex can be collected from a single tree for years without harm to the tree itself.

For collection of the rubber, latex can be concentrated by evaporation or centrifugation. Coagulation is induced by the addition of acetic acid or formic acid.

coagulate the latex. Particles of resin-containing latex float to the surface, along with particles of plant matter. The latex can be collected and washed with acetate to remove most of the resin, following which the rubber is dissolved into hexane and then extracted therefrom by conventional separation methods. This method of rubber recovery is unsuitable in the desert environment in which guayule grows, as it entails enormous energy and water usage, as well as large amounts of organic chemical solvents.

In the second method presently used, rubber is extracted from guayule plants using organic solvents. The extraction can be either sequential or simultaneous. In both cases the guayule plant is typically frozen and pulverized or chipped into flakes. In sequential extraction, resin is removed from the flaked guayule by washing with acetone and the rubber remaining in the flakes is extracted with a nonpolar organic solvent, such as hexane or toluene. In simultaneous extraction, resin-containing rubber is extracted from flaked guayule using a nonpolar solvent. Rubber is then precipitated from the solution using a polar organic solvent such as alcohol.

Neither type of extraction has enjoyed wide-spread commercial success, as the processing steps are time-consuming, expensive, hazardous and energy-intensive. In addition, capital costs for any of the foregoing methods are large, preventing proliferation of local processing plants and therefore necessitating the transport of unprocessed guayule plants over relatively long distances. This is particularly the case where, in underdeveloped countries, industrial processing centers are typically unavailable near areas of production.

Processes are needed which avoid the disadvantages associated with conventional rubber extraction methods and which give a good yield of rubber in a short amount of time. Such processes should achieve the extraction efficiently, without the use of excessive heat or organic solvents. Additionally, such processes will preferably result in a rubber product substantially free of resins and proteins.

SUMMARY OF THE INVENTION

The present invention avoids most, if not all, of the disadvantages of the prior art methods and products and comprises the application of a guanidine salt solution to guayule plants to effect both a softening of the plant cell tissue and denaturation of the protein coat that surrounds each globule of rubber. Pulverization, grinding or crushing of the treated plants releases the rubber particles into the guanidine solution. The rubber particles are then easily separated from the solution, such as by centrifugation, and are, upon collection, essentially pure rubber.

The present invention resulted from observation of unexpected phenomena during routine extraction of nucleic acids from guayule plants. Such RNA extraction was initially conducted to facilitate the study of mRNA encoding 3-hydroxy-3-methylglutaryl CoA (HGMR), which in turn is useful in the study of rubber biosynthesis. In the course of an extraction, it was discovered that the extraction process appeared to have caused a portion of the rubber present in the plant to have collected in recoverable form.

DETAILED DESCRIPTION OF THE INVENTION

According to a preferred embodiment of the method of the present invention, guayule plants are first harvested and treated with an aqueous solution of guanidine salt. The plants may be chopped, shreaded, or otherwise reduced in size, but this is not necessary for successful practice of the present invention. Because guayule plants have relatively insignificant amounts of rubber in their leaves, it may be preferred to remove the plant leaves prior to commencing extraction, in order to reduce the mass to be processed. Of course, where unicellular plants or microorganisms are the rubber producing species, it may be possible to avoid the size reduction step. For the purposes of the invention the term plant cell will be understood to include such unicellular organisms if capable of producing polyisoprene.

Following immersion of the plant matter in the solution for a period of time ranging from about 20 minutes to about 1 hour, the mixture is blended or ground such that the plant matter is reduced to very small particles. Shorter or longer soaking periods may be used, but are not preferred. It has been found that the initial soaking in the solution produces a softening of the plant cell walls, so that much less grinding force is required after soaking than would be necessary with untreated plant material. The objective of the grinding is to rupture each cell wall and allow the solution to contact the rubber globule(s) within each cell.

When the plant matter has been sufficiently ground, the solution, or extraction mixture, is murky. The rubber particles released from within the plant cells are suspended in the extraction mixture. Filtration of the extraction mixture, such as by passage though a layer of glass wool removes floating plant fiber. Centrifuging the mixture causes the less dense rubber particles to collect and agglomerate, forming a pellicle of white rubber, which is easily retrieved. Following collection of the rubber pellicle from the centrifuge, it may be rinsed with a small amount of acetone and dried for future use.

Guanidine salts that may be used in the present invention include guanidine hydrochloride and guanidine thiocyanate. Guanidine thiocyanate has been found to be particularly efficacious in the present invention. It may nevertheless be preferable to use guanidine hydrochloride, due to its significant cost advantage. It has also been found that potassium thiocyanate is operable in the present method, although with a lesser degree of success. It is suspected that such inorganic reagents act by denaturing the protein that surrounds the rubber particles. Thus, other inorganic chemicals capable of causing denaturation of the rubber's protein coat without affecting the rubber itself would be suitable for use in the solution of the present invention.

Nuclear magnetic resonance (NMR) studies comparing rubber produced by the methods of the present invention to rubber produced by conventional methods indicate that the present methods result in a white, essentially protein-free, resin-free rubber. Specifically, the comparative NMR studies indicate that only rubber-specific and solvent peaks, and not resin peaks, appear in rubber from the methods described herein. As stated above, the absence of resins is desirable, making the present methods an improvement over the art, in that the present methods eliminate the need to remove resins from the rubber.

Furthermore, the rubber extracted according to the present method, unlike the Hevea rubber extracted by conventional methods, is essentially free of proteins. Comparative gel electrophoresis of the rubber preparations of the invention show no protein bands associated with the rubber product of the invention. This is particularly important in uses where the rubber products are likely to come into contact with human skin, as the presence of such proteins can cause an allergic reaction in some individuals.

Finally, the present method produces a greater yield than either of the known processes, giving at least 5–10 percent more rubber from the same amount of plant matter. The following Examples illustrate the relative effectiveness of the present method as compared to known methods. To ensure consistency between the tests, 12 grams of guayule stem bark was cut into small pieces and the pieces were mixed well. The 12 gram sample was divided into six 2 gram samples. Each of the three methods was carried out twice. The results are tabulated in Table I.

EXAMPLE A

Guanidine Extraction

Two grams of guayule stem bark were imbibed with 6 ml of 8M guanidine hydrochloride solution for about 15 minutes. The tissue of the guayule bark was softened and was easily ground with a mortar and pestle. The homogeneous paste produced by grinding was filtered through one layer of glass wool to produce an extraction solution. 12 ml of 4M guanidine hydrochloride was used to wash the mortar and pestle. The 12 ml were filtered and added to the extraction solution. The extraction solution was centrifuged at 17,000×g (where g is the acceleration of gravity) for 15 minutes. Rubber coagulated and formed a non-dispersible mass at the surface of the solution and was easily collected using forceps. The rubber mass was rinsed with a small amount of acetone, weighed and dried for further experiments. The quantitative results of this and the succeeding Examples are tabulated in Table I.

EXAMPLE B

Sequential Organic Extraction

Sequential organic extraction was performed by an essentially conventional method. Two grams of guayule stem bark was cut into small pieces. The tissue was ground in 20 ml acetone with a mortar and pestle. The homogenized sample was centrifuged at 6,000×g for 5 minutes and the acetone supernatant fraction removed. The pellet was extracted once more with acetone to remove terpenoid resin. The rubber was extracted from the pellet by soaking in 20 ml hexane for 2 hours. The mixture was centrifuged and the pellet was re-extracted with an additional 20 ml hexane for 30 minutes. The hexane extraction solutions were combined and separated from the rubber by evaporation. The rubber produced by this method was weighed.

EXAMPLE C

Simultaneous Organic Extraction

Simultaneous organic extraction was performed by an essentially conventional method. Two grams of guayule stem bark were cut into small pieces and dried in an oven at 50° C. for 3 hours. The tissue was ground in 10 ml toluene with a mortar and pestle. The mortar and pestle were washed with 10 ml toluene. The toluene solutions were combined and shaken for 4 hours to ensure thorough extraction of the rubber from the plant matter. The mixture was then centrifuged at 6,000×g for 10 minutes and the supernatant was passed through one layer of cheese cloth. Approximately 40 ml of absolute ethanol was added to the toluene extract to precipitate the rubber. The extract was spun down at 20,000×g for 20 minutes. The rubber pellet was washed, dried and weighed.

TABLE I

| | Quantitative Results - Rubber Produced (g) | | |
|---|---|---|---|
| Run No. | Guanidine Extraction | Sequential Organic Extraction | Simultaneous Organic Extraction |
| 1 | 0.150 | 0.144 | 0.133 |

TABLE I-continued

| | Quantitative Results - Rubber Produced (g) | | |
|---|---|---|---|
| Run No. | Guanidine Extraction | Sequential Organic Extraction | Simultaneous Organic Extraction |
| 2 | 0.140 | 0.132 | 0.127 |
| Average | 0.145 | 0.138 | 0.130 |

The Table reflects one set of results, produced from one batch of plant material. The amounts of rubber produced by the various methods may vary by as much as about fifty percent (50%), depending on the plant material itself, time of harvest, and other factors. It is believed however, that Table I reflects the relative performance of the three rubber recovery methods.

While a preferred embodiment of the invention has been shown and described, modifications thereof can be made by one skilled in the art without departing from the spirit of the invention. For example, the plant species used, denaturing solvent, time of treatment and amount of grinding and other aspects of the invention can be changed without departing from the spirit of the invention.

What is claimed is:

1. A method for extracting polyisoprenes from cells containing proteins and polyisoprenes, comprising the steps of:
   contacting the cells with an organic protein-denaturing compound comprising an aqueous solution of a guanidine salt;
   rupturing the cells to release the polyisoprene from the cells and;
   recovering the polyisoprene.

2. The method according to claim 1 wherein the steps are carried out without the addition or removal of heat.

3. The method according to claim 1 wherein the releasing step includes applying mechanical force to the cells.

4. The method according to claim 3 wherein the releasing step further includes producing an homogenate in which polyisoprene released from said cells is suspended.

5. The method according to claim 4 wherein the recovering step comprises:
   centrifuging said homogenate to coagulate the polyisoprene; and
   recovering the polyisoprene from the centrifuge.

6. The method according to claim 5, further including the steps of:
   recovering said compound; and
   reusing said compound.

7. The method according to claim 5 wherein the centrifuging step is carried out at least 10,000×g.

8. The method according to claim 1 wherein the cells are derived from guayule plants.

9. The method according to claim 1 wherein said contacting step is carried out for a period of from about 20 minutes to about 60 minutes.

10. An improved process comprising the steps of treating polyisoprene-containing plant cells with a solvent to extract the polyisoprene and then separating the polyisoprene from the solvent, wherein the improvement comprises;
    using a compound comprising an aqueous solution of a guanidine salt.

11. The improved polyisoprene extraction process of claim 10 wherein said guanidine salt is selected from the group consisting of urea, sodium chloride, guanidine thiocyanate, guanidine hydrochloride, guanidine carbonate and guanidine nitrate.

12. The improved polyisoprene extraction process of claim 11 wherein said compound comprises an aqueous solution.

13. An improved process comprising the steps of treating polyisoprene-containing plant cells with a solvent to extract the polyisoprene and then separating the polyisoprene from the solvent, wherein the improvement comprises;

using a solution of potassium thiocyanate as the solvent.

* * * * *